United States Patent
Okada et al.

(10) Patent No.: US 9,751,238 B2
(45) Date of Patent: Sep. 5, 2017

(54) DEVICE FOR MEASURING THRUST LOAD ACTING ON ROTOR OF SEALED KNEADING APPARATUS

(71) Applicant: Kobe Steel, Ltd., Hyogo (JP)

(72) Inventors: Toru Okada, Kobe (JP); Yusuke Tanaka, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/037,461

(22) PCT Filed: Dec. 9, 2014

(86) PCT No.: PCT/JP2014/082584
§ 371 (c)(1),
(2) Date: May 18, 2016

(87) PCT Pub. No.: WO2015/093351
PCT Pub. Date: Jun. 25, 2015

(65) Prior Publication Data
US 2016/0297102 A1    Oct. 13, 2016

(30) Foreign Application Priority Data
Dec. 20, 2013    (JP) .................... 2013-263891

(51) Int. Cl.
*B29B 7/28*    (2006.01)
*B29B 7/18*    (2006.01)
(Continued)

(52) U.S. Cl.
CPC .............. *B29B 7/283* (2013.01); *B01F 7/081* (2013.01); *B01F 15/00201* (2013.01);
(Continued)

(58) Field of Classification Search
CPC ....... B29B 7/7495; B29B 7/283; B29B 7/246; B29B 7/401; B29B 7/22; B29B 7/183;
(Continued)

(56) References Cited

U.S. PATENT DOCUMENTS 4,768,389 A *  9/1988  Chszaniecki ....... B30B 15/0094
                                                73/862.49
9,643,338 B2 *  5/2017  Edwards ................. B29B 7/183
(Continued)

FOREIGN PATENT DOCUMENTS

JP    H10-044145 A     2/1998
JP    2001-277236 A    10/2001

OTHER PUBLICATIONS

International Search Report issued in PCT/JP2014/082584; dated Feb. 10, 2015.
(Continued)

*Primary Examiner* — Charles Cooley
(74) *Attorney, Agent, or Firm* — Studebaker & Brackett PC

(57) ABSTRACT

A device for measuring a thrust load acting on a rotor of a hermetically sealed kneader includes displacement sensors (19) and a load-calculating member. The displacement sensors (19) are configured to measure relative displacement along the axial direction of an outer ring-fixing member (17), which is for fixing the outer ring (16) of one end of a bearing (6), or a casing (18) with respect to an inner ring-fixing member (20), which is for fixing the inner ring (13) of the one end of the bearing (6), or the rotor (5). The load-calculating unit calculates the thrust load acting on the rotor (5) by multiplying the relative displacement measured by the displacement sensors (19) by a conversion coefficient.

5 Claims, 3 Drawing Sheets

(51) Int. Cl.
  *B29B 7/26* (2006.01)
  *B01F 7/08* (2006.01)
  *B01F 15/00* (2006.01)
  *G01L 5/12* (2006.01)
  *B29C 47/08* (2006.01)
  *G01L 25/00* (2006.01)
  *B29B 7/24* (2006.01)

(52) U.S. Cl.
  CPC .............. *B29B 7/183* (2013.01); *B29B 7/263* (2013.01); *B29C 47/0801* (2013.01); *G01L 5/12* (2013.01); *G01L 25/00* (2013.01); *B29B 7/246* (2013.01)

(58) Field of Classification Search
  CPC ......... B29B 7/263; B29B 7/18; B01F 15/026; B01F 7/04; G01L 5/12; G01L 25/00
  USPC .................................................. 366/76.7, 76.8
  See application file for complete search history.

(56) References Cited

U.S. PATENT DOCUMENTS

| | | | |
|---|---|---|---|
| 2015/0082896 A1* | 3/2015 | Wu | G01L 5/24 73/761 |
| 2016/0297101 A1* | 10/2016 | Okada | G01L 5/12 |
| 2016/0297102 A1* | 10/2016 | Okada | B29B 7/18 |

OTHER PUBLICATIONS

Written Opinion issued in PCT/JP2014/082584; dated Feb. 10, 2015.

* cited by examiner

MEASURED WAVEFORM

MODIFIED WAVEFORM

US 9,751,238 B2

DEVICE FOR MEASURING THRUST LOAD ACTING ON ROTOR OF SEALED KNEADING APPARATUS

TECHNICAL FIELD

The present invention relates to a device for measuring a thrust load generated on a rotor when a kneading material is kneaded in a hermetically sealed kneader.

BACKGROUND ART

There is an apparatus disclosed in Patent Document 1 as a conventional hermetically sealed kneader which kneads a kneading material such as rubber, plastics, or the like. The hermetically sealed kneader of Patent Document 1 is configured so that the kneading material such as rubber, plastics, or the like injected into a kneading chamber is kneaded by two rotors arranged in the kneading chamber and so that the kneading material turned into a desired kneaded state is taken out to the outside. These two rotors are each configured so that both ends of a shaft are rotatably supported by bearings. The end of each rotor at the drive side is an input shaft projected to the outside. An output shaft of a drive unit adjacently arranged and the input shaft are coupled to each other via a coupling device such as a gear coupling.

In the hermetically sealed kneader of Patent Document 1, the kneading material such as rubber, plastics, or the like is inputted with various types of additives from a slot at the upper side into a hopper by a predetermined volume. This kneading material is injected into the sealed kneading chamber by a push-in action of a floating weight. The kneading material injected into the kneading chamber in this manner is kneaded by the rotors rotating in directions different from each other. A driving force (rotation) of a motor is transmitted via a speed reducer to the respective rotors. The respective rotors rotate so as to wipe an inner wall of the kneading chamber and rotate in the different directions from each other. Thus, a resin material (the kneading material) injected into the kneading chamber is kneaded with the various types of additives; thereafter, the kneading material turned into the desired kneaded state is taken out to the outside.

Further, a blade (kneading blade) is arranged on an outer circumferential surface of the rotor. In the hermetically sealed kneader of Patent Document 1, this blade is configured to be twisted in a spiral shape with respect to an axis line of the rotor. The kneading material such as rubber, plastics, or the like is injected in the axial direction by an action of this twisted blade; therefore, a flow to feed the kneading material in the axial direction is generated. Furthermore, the two rotors are configured so that the blades are respectively twisted so as to generate flows in directions different from each other with respect to the axial direction, thereby allowing the kneading material to be fed so that the material is circulated in the chamber. Thus, the kneading material may be effectively kneaded.

In addition, in the hermetically sealed kneader disclosed in Patent Document 1, that is, in a general hermetically sealed kneader, the kneading material is fed in the axial direction by the blade that is formed on the rotor to be twisted in a spiral shape; therefore, its reaction generates a reaction force (thrust load) acting in the axial direction. Such thrust load significantly affects a life span of the bearing that supports the rotor. Therefore, in order to determine the life span of the bearing, it is necessary that a thrust load is accurately measured. Further, in a case where a thrust load cannot be accurately perceived, a problem that a thrust load greater than a designed load is applied to the bearing; on the contrary, a bearing over the specification is utilized, may be caused. Accordingly, in a case where the aforementioned type of bearing is applied, preferably, a means which can accurately measure a load in a thrust direction, acting on the rotor, is provided.

For example, Patent Document 2 discloses a method in which a load sensor is provided between a bearing body and a casing to thereby measure a load which acts on a bearing.

CITATION LIST

Patent Document
Patent Document 1; JP H10-44145A
Patent Document 2: JP 2001-277236A

SUMMARY OF THE INVENTION

Problems to be Solved by the Invention

The aforementioned method of Patent Document 2 is to measure a radial load (to be precise, a load generated when rolls radially separate from each other), and the method seems to be sufficiently applicable to a case where a thrust load is measured. However, a measuring device applied in this method has a complicated configuration, and the measuring device requires a relatively large space for installation and the installation space is limited; therefore, it may be difficult to install the measuring device. Further, in a case where the measuring device is additionally attached to the existing kneading equipment, a casing of a kneader may need to be significantly modified; therefore, it is difficult to install the measuring device in the existing equipment.

The present invention is made in view of the aforementioned problems. It is an object of the present invention to provide a device for measuring a thrust load acting on a rotor of a hermetically sealed kneader, the device being simply configured, and the device being able to be additionally installed in the existing equipment and able to highly accurately measure the thrust load acting on the rotor.

Means to Solve the Problems

A device for measuring a thrust load acting on a rotor of a hermetically sealed kneader of the present invention takes the following technical measures in order to solve the aforementioned problems. That is, the device for measuring a thrust load acting on a rotor of a hermetically sealed kneader, which is provided with the device, of the present invention includes a pair of rotors which are arranged adjacent to each other at a predetermined interval so that axes are in parallel with each other and which rotate in directions different from each other, wherein bearings are provided at both ends of each of the pair of rotors, the bearings supporting a load in a radial direction, which acts on each rotor, and a load in a thrust direction, which acts on the rotor is supported by one of the bearings, which is at one end of the both ends, wherein at least one or more displacement sensors are arranged on an outer ring fixing member for fixing an outer ring of the bearing at the one end or on a casing to which the outer ring fixing member is attached, wherein the displacement sensor can measure a relative displacement in an axial direction between the outer ring fixing member or the casing and an inner ring fixing member for fixing an inner ring of the bearing at the one end or the rotor to which the inner ring fixing member is attached, and wherein a load calculating unit is provided, the load calculating unit calculating the thrust load acting on the rotor, by multiplying the relative displacement measured by the displacement sensor by a conversion coefficient.

Further, preferably, a blade twisted in a spiral shape with respect to an axis line of the rotor is formed on the rotor, and the thrust load acting on the bearing at the one end is applied in one direction along the axial direction.

Furthermore, preferably, the displacement sensor includes a plurality of displacement sensors which are arranged at an equal distance from the axis of the rotor and circumferentially at equal intervals, and the load calculating unit obtains a representative relative displacement by averaging measurement values measured by the plurality of the displacement sensors and calculates the thrust load acting on the rotor from the obtained representative relative displacement.

In addition, preferably, the device is provided with a rotation sensor for detecting a rotation of the rotor, wherein the displacement sensor measures in one rotation of the rotor, which is detected by the rotation sensor, a waveform of a relative displacement in a state where a kneading material is not inputted and a waveform of a measured relative displacement in a state where the kneading material is inputted, and wherein the load calculating unit calculates the thrust load acting on the rotor by using a difference waveform between the measured waveform of the relative displacement in a state where the kneading material is not inputted and the measured waveform of the relative displacement in a state where the kneading material is inputted.

Advantageous Effect of the Invention

According to a device for measuring a thrust load acting on a rotor of a hermetically sealed kneader of the present invention, the device is simply configured, and the device can be additionally installed in the existing equipment and can highly accurately measure the thrust load acting on the rotor.

DESCRIPTION OF EMBODIMENTS

First Embodiment

Figure 1:
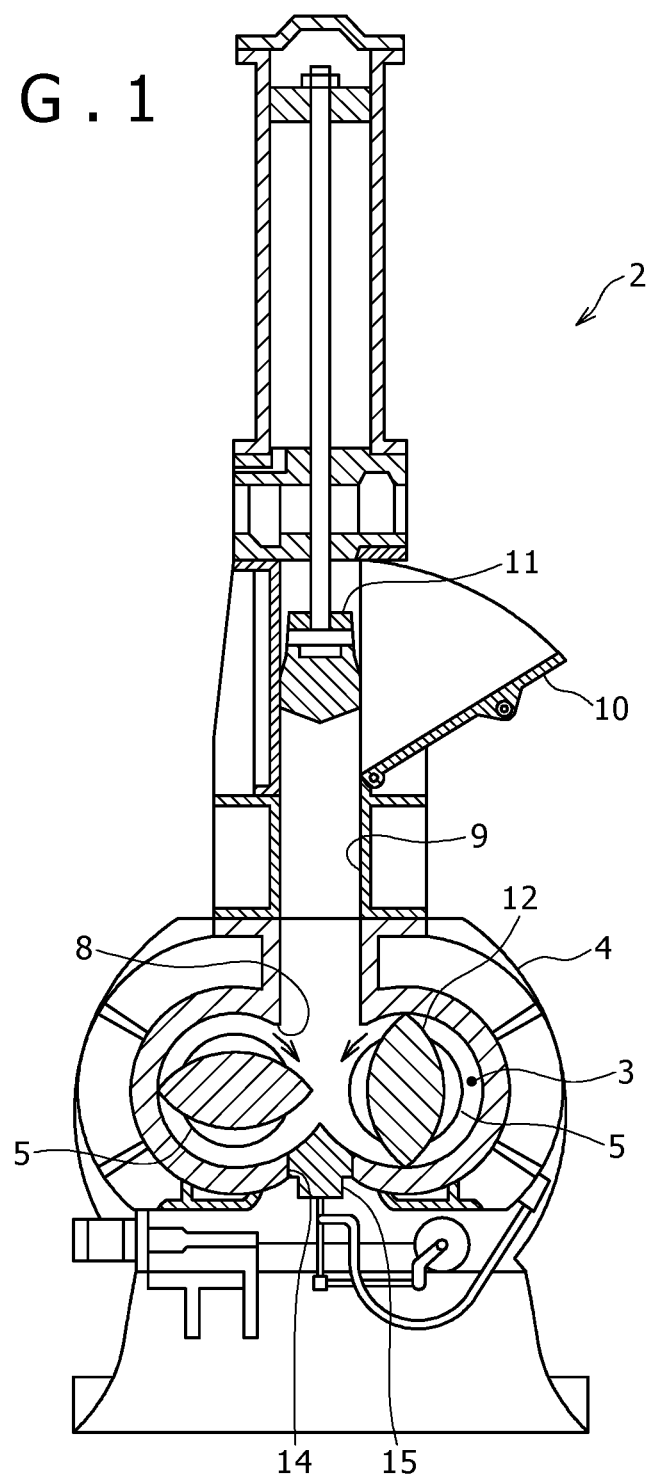
FIG. 1 is a cross-sectional view of an inside of a hermetically sealed kneader in which a thrust load measuring device of a first embodiment is provided.

Hereinafter, a thrust load measuring device 1 of a first embodiment will be described in detail on the basis of the drawings. First, prior to explanation of the thrust load measuring device 1, a hermetically sealed kneader 2 in which the measuring device 1 of the first embodiment is provided will be explained. FIG. 1 schematically illustrates the hermetically sealed kneader 2 of the first embodiment.

Figure 2:
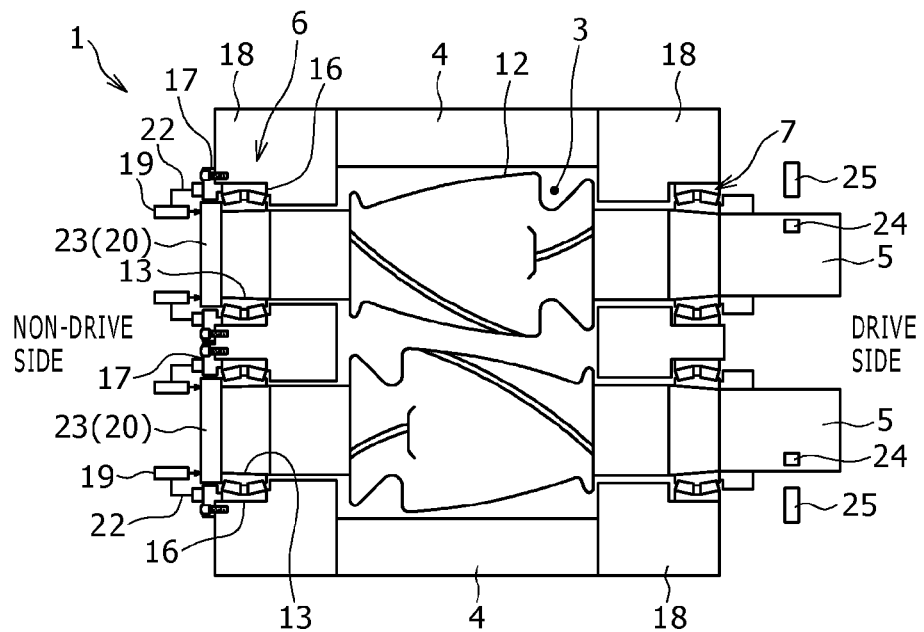
FIG. 2 is a diagram of a kneading portion of the hermetically sealed kneader and the measuring device of the first embodiment.

As shown in FIG. 1 and FIG. 2, the hermetically sealed kneader 2 of the first embodiment is provided with a housing 4, the inside of which is a kneading chamber 3 and with a pair of rotors 5, 5 which are arranged in the housing 4. In addition, the hermetically sealed kneader 2 is configured so that a kneading material such as rubber, plastics, or the like injected into the kneading chamber 3 is kneaded by the pair of rotors 5, 5 and so that the kneading material turned into a desired kneaded state is taken out to the outside. Both ends of each of the pair of rotors 5, 5 in the axial direction thereof are rotatably supported by bearings 6, 7. Moreover, one end (a non-drive side) of the rotor 5 in the axial direction is not projected to the outside of the housing 4 while the other end (a drive side) of the rotor 5 in the axial direction is projected to the outside of the housing 4. A coupling device such as a gear coupling is coupled to the other end of the rotor 5, which is projected, and a drive force generated in a drive unit is inputted via the coupling device.

Further, in the description below, the left side on the sheet of FIG. 2 will be referred to as "non-drive side" or "one end" for explanation of the measuring device, and the right side on the sheet will be referred to as "drive side" or "the other end" for explanation of the measuring device. Furthermore, the upper side on the sheet of FIG. 1 will be referred to as "upper side" for explanation of the measuring device, and the lower side on the sheet will be referred to as "lower side" for explanation of the measuring device. As shown in FIG. 1, an opening 8 opened upward is formed at an upper portion of the kneading chamber 3. A material introduction passage 9 for guiding (introducing) the kneading material such as rubber, plastics, or the like in an up to down direction is formed at the upper side of the opening 8. In addition, a hopper 10 pivoted downward to be openable is formed at an upper portion of the material introduction passage 9. The kneading material in which additives or the like are combined into a base material such as rubber, plastics, or the like is inputted from the hopper 10. Moreover, a floating weight 11 is provided in the material introduction passage 9 so as to move in a direction in which the material introduction passage 9 is formed (in the up to down direction). The floating weight 11 is moved downward; thereby, the kneading material inputted in the material introduction passage 9 can be pushed downward into the kneading chamber 3.

The kneading chamber 3 is formed in a shape (in a shape of eyeglasses holes in cross section along a direction perpendicular to the axial direction) where two tubular voids are arranged at the right and left sides so that their outer circumferential surfaces are partially overlapped with each other. The aforementioned pair of rotors 5, 5 is arranged within the kneading chamber 3. Axes of this pair of rotors 5, 5 are substantially identical to the centers of the two tubular voids of the kneading chamber 3. As shown in FIG. 2, a blade 12 for kneading the kneading material is formed on an outer circumferential surface of each rotor 5. This blade 12 formed on the outer circumferential surface of the rotor 5 is configured to be twisted with respect to the axial direction (axis line) of either rotor 5, and the rotor 5 at the right side and the rotor 5 at the left side are formed so as to generate flows in the kneading material, which are in opposite directions from each other with respect to the axial direction.

Bearings 6, 7 which support the rotor 5 so that this rotor 5 is rotatable are provided respectively at the both ends of each rotor 5. Bearings each of which can support a load in a thrust direction as well as a load in a radial direction are applied to these bearings 6, 7 at the both ends. Conical roller bearings each having plural rows or self-aligning ball bearings are applied to such bearings 6, 7. In addition, the bearing 7 at the other end of the rotor 5 is configured so as to slide in the thrust direction in order to absorb thermal elongation of the rotor 5.

Further, a speed reducer which reduces a rotational driving force (rotation) generated in the drive unit such as a motor to transmit the driving force is arranged at the other end of the rotor 5 in the axial direction. This rotational driving force reduced by the speed reducer is inputted via the aforementioned coupling device (the gear coupling which can allow deviation between the axis of the speed reducer and the axis of the rotor 5 and allow the rotor 5 to move in the axial direction) to each rotor 5; thereby, the rotors 5 rotate in directions different from each other. Furthermore, one end of the rotor 5 in the axial direction is formed in a tapered shape toward the distal end. An inner ring 13 of the bearing 6 is attached to a portion of this taper shape.

Figure 3:
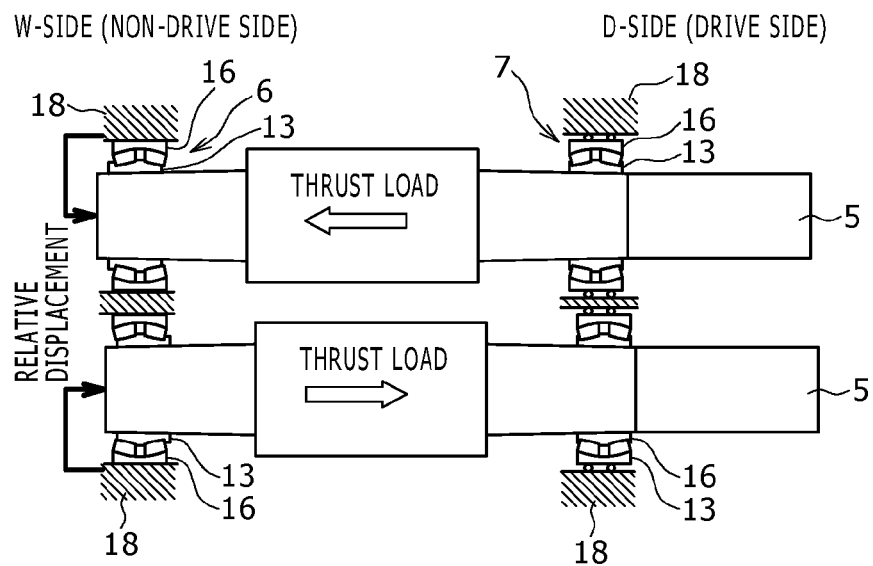
FIG. 3 is a schematic view of the kneading portion of the hermetically sealed kneader and the measuring device of the first embodiment.

In other words, in the aforementioned hermetically sealed kneader 2, the rotor 5 rotates so that the blade 12 wipes an inner wall of the kneading chamber 3, and the kneading material injected into the kneading chamber 3 is kneaded with the various additives by the blade 12 that is formed on the rotor 5. At this time, the blades 12 of the respective rotors 5 are twisted in the same direction and the rotors 5 rotate in directions opposite from each other. Therefore, on the rotor 5 shown at the upper side in FIG. 3, a thrust load acting from the other end (the drive side) to one end (the non-drive side) in the axial direction is generated; meanwhile, on the rotor 5 shown at the lower side in FIG. 3, a thrust load acting from one end (the non-drive side) to the other end (the drive side) in the axial direction is generated. Here, the thrust loads generated on the rotor 5 shown at the upper side and the rotor 5 shown at the lower side in FIG. 3 are both supported by the bearings 6 at one end.

A drop door 15 of a discharge port 14 which is formed at the lower side of the kneading chamber 3 is opened; thereby, the kneading material kneaded by the rotation of the rotors 5 as just described is taken out from the discharge port 14 to the outside of the kneading chamber 3. In addition, after the kneading material is taken out, the drop door 15 is pivoted back to the upper side to thereby close the discharge port 14 of the kneading chamber 3, and a subsequent batch of the kneading material is pushed from a slot into the kneading chamber 3 by using the floating weight 11. Such batch kneading cycle is repeated; thereby, kneading is performed in the aforementioned hermetically sealed kneader 2.

In addition, the thrust load generated on the rotor 5 along with kneading of the kneading material significantly affects a life span of a bearing (thrust bearing) which supports the rotor 5. Therefore, in order to determine the life span of the bearing, it is necessary that the thrust load is accurately measured. In a case where such thrust load is applied, a displacement (relative displacement) between an outer ring 16 and the inner ring 13 is generated on a bearing which can support both a radial load and a thrust load. The inventors of the present invention have focused attention on this relative displacement and have come to obtain knowledge about the technique to calculate the thrust load from the relative displacement.

In other words, the hermetically sealed kneader 2 of the present invention is provided with the measuring device 1 for measuring a thrust load from a relative displacement generated on the bearing 6 that can support the thrust load. Specifically, in the measuring device 1, at least one or more displacement sensors 19 are arranged at an outer ring fixing member 17 (bearing restraint) for fixing the outer ring 16 of the bearing 6 that supports a thrust load or at a casing 18 to which the outer ring fixing member 17 is attached. The displacement sensor 19 is configured so as to measure a position of an inner ring fixing member 20 for fixing the inner ring 13 of the bearing 6 at one end or a position of the rotor 5 to which the inner ring fixing member 20 is attached. That is, the displacement sensor 19 is configured so as to measure a relative displacement of the inner ring 13 to the outer ring 16 in the axial direction. In addition, the measuring device 1 is provided with a load calculating unit (not shown) which multiplies the relative displacement measured by the displacement sensor 19 by a conversion coefficient to thereby calculate a thrust load acting on the rotor 5.

Next, the displacement sensor 19 and the load calculating unit that configure the measuring device 1 of the present invention will be described in detail. Among the bearings 6, 7 arranged in the axial direction, the displacement sensor 19 is provided at the bearing 6 at one end on which the thrust load acts. The displacement sensor 19 is configured to measure this displacement which is generated between the outer ring 16 and the inner ring 13 of the bearing 6 in the axial direction.

Specifically, the displacement sensor 19 is attached to a member at the outer ring 16 of the bearing 6 and is configured to measure the relative displacement (an amount of axial displacement of the inner ring 13 of the bearing 6 relative to the outer ring 16 of the bearing 6) on the basis of a distance from the outer ring 16 to a member at the inner ring 13 of the bearing 6. In a case where the outer ring 16 cannot be seen from the outside, a member which is fixed in the same way as the outer ring 16, for example, the outer ring fixing member 17 for fixing the outer ring 16, the casing 18 at which the outer ring fixing member 17 is provided, or the like is adopted as "the member at the outer ring 16 of the bearing 6" to which the displacement sensor 19 is attached. Meanwhile, in a case where the inner ring 13 cannot be seen from the outside, a member which is movable in the axial direction along with the inner ring 13 (a member which makes the same movement as the inner ring 13), for example, the inner ring fixing member 20 for fixing the inner ring 13, the rotor 5 to which the inner ring fixing member 20 is attached, or the like is adopted as "the member at the inner ring 13 of the bearing 6" of which the displacement is measured by the displacement sensor 19.

Further, a contactless displacement gauge or the like utilizing a laser, an eddy current, or the like can be appropriately applied to such displacement sensor 19 while a contact displacement gauge or the like may be also applied. Further, the displacement sensor 19 of the embodiment is configured in such a way that a laser displacement gauge is provided at a distal end of an attaching member 22 which is attached on an outer surface of the outer ring fixing member 17 so as to protrude therefrom to the non-drive side. Furthermore, the displacement sensor 19 is configured to measure an axial position of an end surface of the rotor 5 (a cap 23 of the rotor 5) with a laser, thereby measuring the relative displacement between the outer ring 16 and the inner ring 13 in the axial direction.

The load calculating unit (illustration thereof is omitted) is configured to calculate the thrust load acting on the bearing 6 at one end from the relative displacement that is measured by the aforementioned displacement sensor 19. Specifically, in the load calculating unit, the relative displacement measured by the displacement sensor 19 is multiplied by a conversion coefficient and thereby the thrust load acting on the bearing 6 at one end, i.e., the thrust load generated on the rotor 5 is calculated. This conversion coefficient is a spring constant obtained from the fact that the load elastically changes as a spring with respect to the relative displacement. An already-known thrust load (for example, a load generated by pressing via a load cell with a hydraulic cylinder) is applied to the axis of the rotor 5 and the relative displacement is calibrated while being measured in a state where the rotor 5 is brought in a rotating mode; thereby, a value of the conversion coefficient can be calculated.

In other words, if, preliminarily, the value of the conversion coefficient is acquired and the conversion coefficient is inputted to the load calculating unit, the relative displacement measured by the displacement sensor 19 is multiplied by this conversion coefficient and therefore the thrust load can be calculated. In addition, a personal computer or the like which performs a calculation by loading measurement results of the displacement sensor 19 with a data logger, a memory, or the like is applied to an actual load calculating unit. Next, a method for measuring a thrust load by using the aforementioned measuring device 1, i.e., a thrust load measuring method of the present invention will be described.

As shown in FIG. 2, when the aforementioned rotor 5 is rotated, the blade 12 twisted along the axial direction in a spiral shape kneads the kneading material. Along with such kneading, a thrust load is generated on the rotor 5. The thrust load generated in this manner is supported by the bearing 6 provided at one end of the rotor 5. Specifically, on the rotor 5 at the upper side in FIG. 2, the inner ring 13 in the bearing 6 at one end horizontally slides toward one end with respect to the outer ring 16 that is fixed by the application of the thrust load. The amount of slide of the inner ring 13 with respect to the outer ring 16 varies in accordance with the size of the thrust load. Therefore, in the measuring method of the present invention, a relative displacement is measured by the aforementioned displacement sensor 19 and the measured relative displacement is multiplied by the conversion coefficient; thereby, the thrust load is calculated.

In other words, in the measuring device 1 of the present invention, the displacement sensor 19 is attached to the aforementioned outer ring fixing member 17 that fixes the outer ring 16 of the bearing 6, and an axial position of the inner ring fixing member 20 that fixes the inner ring 13 of the bearing 6 is measured by using this displacement sensor 19. Thus, a clearance between the outer ring 16 and the inner ring 13 of the bearing 6, i.e., the relative displacement generated between the outer ring 16 and the inner ring 13 of the bearing 6 in the axial direction can be measured.

A result of the relative displacement measured by the displacement sensor 19 in this manner is sent to the load calculating unit. In the load calculating unit, the result of the relative displacement is multiplied by the already-known conversion coefficient, thereby calculating the thrust load. The aforementioned measuring device 1 is configured only by the plural displacement sensors 19 that are attached to the bearings 6 of the rotors 5 of the hermetically sealed kneader 2 and the load calculating unit that processes measurement results of the plural displacement sensors 19. Therefore, the device itself is configured very simply; nevertheless, it can highly accurately measure the thrust load acting on the rotor 5 from the relative displacement generated between the outer ring 16 and the inner ring 13 of the bearing 6.

Further, in a case where the displacement sensor 19 is only attached to the rotor 5, the measuring device 1 can be additionally provided at the existing equipment while not being significantly modified, therefore being superior in convenience. Furthermore, a relative displacement is regularly measured by the aforementioned measuring device 1 and the relative displacement is monitored so as not to deviate from a management value; thereby, abnormality such as wear of the bearing 6 can be observed. This is because as wear of the bearing 6 progresses, a clearance (backlash) in the bearing 6 increases and the relative displacement increases. Therefore, an increase of the relative displacement is observed; thereby, an appropriate timing for replacement of the bearing 6 can be determined.

In addition, if a clearance (backlash) exists in the bearing 6 when the aforementioned measuring device 1 measures a displacement between the outer ring 16 and the inner ring 13 to calculate a load, the accuracy may decrease. This is because in a case where there is a clearance (backlash) in the bearing 6 in a direction in which a thrust load is applied, a large relative displacement may be measured even under a small load and therefore the load calculating unit may determine by mistake that a large load is generated and may have difficulty accurately calculating the thrust load.

However, in the hermetically sealed kneader 2 to which the measuring device 1 of the present invention is applied, no backlash is generated in the bearing 6 during kneading. This is because the rotors 5 are configured to have the blades 12 twisted in the same direction and to rotate in the different directions from each other and therefore a thrust load acting from the other end (the drive side) to one end (the non-drive side) in the axial direction is generated on the rotor 5 shown at the upper side in FIG. 3 while a thrust load acing from one end (the non-drive side) to the other end (the drive side) is generated on the rotor 5 shown at the lower side in FIG. 3. That is, during kneading, the thrust load acting in one direction along the axial direction is generated on each rotor 5. Accordingly, on the rotor 5 shown at the upper side in FIG. 3, the inner ring 13 of the bearing 6 is pushed toward one end (the non-drive side) while on the rotor 5 shown at the lower side in FIG. 3, the inner ring 13 of the bearing 6 is pushed toward the other end (the drive side). Therefore, in spite of the fact that the bearing 6 has a clearance, no backlash is generated in the bearing 6 during kneading. As a result, a linear relation is established between the relative displacement and the thrust load and the thrust load can be accurately calculated.

Figure 4A:
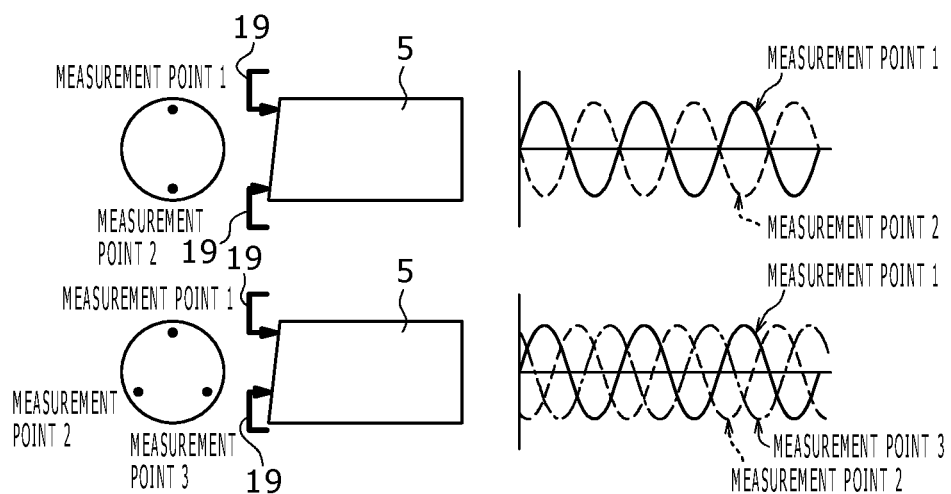
FIG. 4A is a schematic view of the measuring device of a second embodiment.
Figure 4B:
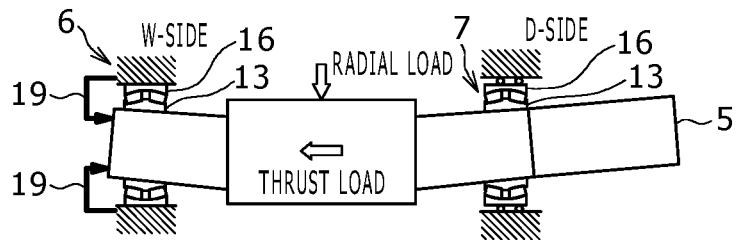
FIG. 4B is a cross-sectional view of the measuring device of the second embodiment.

In addition, the relative displacement measured by the aforementioned displacement sensor 19 may include rotational components of the rotor 5 (undulation components) as an accidental error. If the error is not eliminated, a thrust load may not be accurately calculated. For example, as shown in FIG. 4B, a radial load acting radially outward is generated on the rotor 5 that is rotating. Therefore, the rotor 5 is rotating in a state where a midway point of the rotor 5 in the axial direction is deflected downward by the radial load. Accordingly, such deflection causes the rotor 5 to be inclined relative to the horizontal direction and therefore the end surface (a measurement surface) of the rotor 5 does not align along the vertical direction. As a result, rotational components in synchronization with a rotational period of the rotor 5 are generated in a measured waveform.

In other words, measurement values measured in a case where the displacement sensor 19 is arranged on the end surface of the rotor 5 at the upper side and in a case where the displacement sensor 19 is arranged on the end surface of the rotor 5 at the lower side may be different from each other. Accordingly, it is difficult that an accurate relative displacement is measured. If the displacement can be measured in the center of the end surface of the rotor 5, rotational components are not included in the measurement value. However, generally, a connection or the like of a coolant supply pipe to the rotor 5 is provided in the center of the end surface. Therefore, it is often difficult to provide the displacement sensor 19 in the center of the end surface of the rotor 5.

In such case, an adjustment means (a first adjustment means) as below which eliminates (adjusts) the effect of rotational components of the rotor 5 as an accidental error from a relative displacement is preferably provided. In other words, the first adjustment means includes the plural (two or more) displacement sensors 19 provided circumferentially at equal intervals, thereby eliminating the effect of the rotational components of the rotor 5 by using a mean of measurement values measured by the plural displacement sensors 19.

In other words, these plural displacement sensors 19 are arranged at an equal distance from the axis of each rotor 5 with respect to one another and respectively circumferentially at equal intervals. For example, in an example shown at the upper side in FIG. 4A, the displacement sensors 19 are provided respectively at "a measurement point 1" and "a measurement point 2" at the upper and lower sides on the end surface of the rotor 5, i.e., the two displacement sensors 19 are provided at the single rotor 5 so as to be circumferentially spaced with a phase difference of 180 degrees. Further, in an example shown at the lower side in FIG. 4A, the displacement sensors 19 are provided respectively at "a measurement point 1" at the upper side on the end surface of the rotor 5 and at "a measurement point 2" and "a measurement point 3" at the lower side on the end surface of the rotor 5, i.e., the three displacement sensors 19 are provided at the single rotor 5 so as to be circumferentially spaced with a phase difference of 120 degrees.

As described above, the plural displacement sensors 19 are arranged to be circumferentially spaced with an equal distance (phase difference); thereby, measurement results of relative displacements measured by the displacement sensors 19, respectively are measured with an equal phase difference. Therefore, the sum of the measurement results of all of the displacement sensors 19 is calculated; thereby, the effect of rotational components included in the measurement values, respectively can be canceled together to be eliminated. That is, a representative relative displacement is obtained by averaging the measurement values measured by the plural displacement sensors 19; thereby, the effect of the rotational components of the rotor 5, which are respectively included in the measurement results, is canceled. Therefore, the obtained representative relative displacement does not include the effect of the rotational components of the rotor 5. As a result, the effect of the rotational components of the rotor 5 can be eliminated without a complicated arithmetic processing.

Meanwhile, in a case where an end portion (the measurement surface to be measured by the displacement sensor 19) of the rotor 5 is not flat and is non-smooth and uneven, its effect may appear in a measurement result of a relative displacement. In order to eliminate such effect, an adjustment means (a second adjustment means) as below is preferably provided. As shown in FIG. 2, the second adjustment means is configured so that an indicator 24 (a responding portion) or the like for sensing a rotating state of the rotor 5 is attached on the outer circumferential surface of the rotor 5 and so that a rotation sensor 25 for detecting the indicator 24 is provided radially outward from the outer circumferential surface of the rotor 5. In addition, every time the indicator 24 is detected by the rotation sensor 25, the rotation sensor 25 determines that the rotor 5 has made one rotation, and the displacement sensor 19 measures a relative displacement corresponding to one rotation of the rotor 5, which is determined by the rotation sensor 25.

Next, the displacement sensor 19 measures a waveform of a relative displacement in a state where the kneading material is not inputted and a waveform of a relative displacement in a state where the kneading material is inputted. Then, by using a difference waveform between the measured waveform of the relative displacement in a state where the kneading material is not inputted and the measured waveform of the relative displacement in a state where the kneading material is inputted, a thrust load acting on the rotor 5 is calculated by the load calculating unit. This calculation of the difference waveform is performed every time data of one rotation (one pulse) is measured, and a waveform of the calculation result is outputted as a measurement value after adjustment.

Figure 5A:
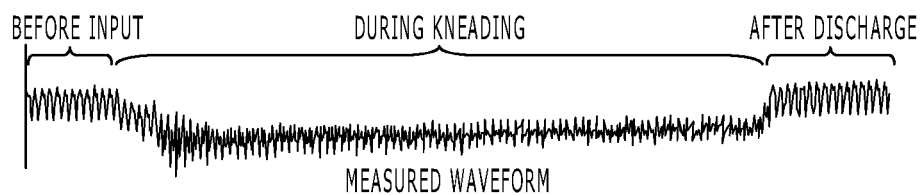
FIG. 5A is a diagram of a measured waveform of a relative displacement.
Figure 5B:
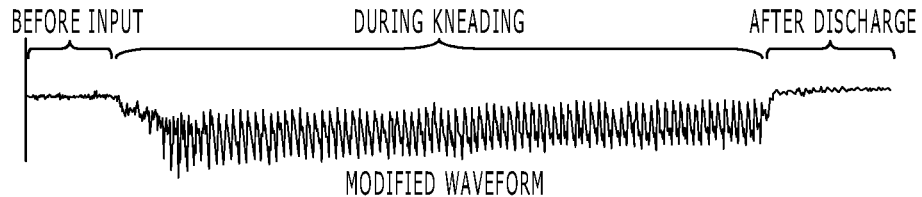
FIG. 5B is a diagram of a modified waveform of a relative displacement in which an adjustment is made.

In such difference waveform obtained by using the second adjustment means, the effect of the rotational components of the rotor 5 is eliminated. Therefore, it is judged that the thrust load can be highly accurately measured even in a case where such difference waveform is used. For example, in a measured waveform of a relative displacement shown in FIG. 5A, as clear as seen from a portion at the time before the material is inputted, the measured waveform periodically varies and includes the effect of the rotational components of the rotor 5. Meanwhile, in a modified waveform where an adjustment is made by the aforementioned adjustment means (see FIG. 5B), it is clear that the measured waveform does not periodically vary and the effect of the rotational components of the rotor 5 is eliminated from the measured waveform.

The aforementioned first and second adjustment means are particularly useful in a case where a thrust load is measured in the hermetically sealed kneader 2, the length of which is long in the axial direction and in which deflection along with rotation is likely to occur. Moreover, in the aforementioned measuring device 1, the displacement sensor 19 is mounted within a hub construction (the displacement sensor 19 is mounted radially inward from the bearing 6 having a hub construction); therefore, the effect of deflection can be further reduced.

In addition, the embodiments disclosed here should be regarded as illustrative in all respects and as non-limitative. In particular, in the embodiments disclosed here, items which are not expressly disclosed, for example, operation conditions/operational provisions, various types of parameters, the size, weight, volume or the like of each component, do not deviate from the scope generally carried out by a person skilled in the art, and values that an ordinary person skilled in the art can be easily assumed are adopted to the items.

This application is based on Japanese Patent Application No. 2013-263891 filed on Dec. 20, 2013, the content of which is incorporated by reference herein.

EXPLANATION OF REFERENCE NUMERALS

1: thrust load measuring device
2: hermetically sealed kneader
3: kneading chamber
4: housing
5: rotor
6: bearing at one end
7: bearing at the other end
8: opening
9: material introduction passage
10: hopper 11: floating weight
12: blade
13: inner ring
14: discharge port
15: drop door
16: outer ring
17: outer ring fixing member
18: casing
19: displacement sensor
20: inner ring fixing member
22: attaching member
23: cap of rotor
24: indicator (responding portion)
25: rotation sensor

The invention claimed is:

1. A device for measuring a thrust load acting on a rotor of a hermetically sealed kneader which includes a pair of rotors which are arranged adjacent to each other at a predetermined interval so that axes are in parallel with each other and which rotate in directions different from each other and bearings provided at opposite ends of each of the pair of rotors, where the bearings support a load in a radial direction which acts on each rotor, and where a load in a thrust direction acting on the rotor is supported by one of the bearings at one end of the opposite ends of each rotor, the device comprising:
    at least one or more displacement sensors arranged on an outer ring fixing member for fixing an outer ring of the bearing at the one end or on a casing to which the outer ring fixing member is attached, and
    a load calculating unit configured to calculate the thrust load acting on the rotor;
    wherein the at least one or more displacement sensors are configure to measure a relative displacement in an axial direction between the outer ring fixing member or the casing and an inner ring fixing member for fixing an inner ring of the bearing at the one end or the rotor to which the inner ring fixing member is attached, and
    wherein the load calculating unit calculates the thrust load acting on the rotor by multiplying the relative displacement measured by the at least one or more displacement sensors by a conversion coefficient.

2. The device for measuring a thrust load acting on a rotor of a hermetically sealed kneader according to claim 1, wherein a blade twisted in a spiral shape with respect to an axis line of the rotor is formed on the rotor, and the thrust load acting on the bearing at the one end is applied in one direction along the axial direction.

3. The device for measuring a thrust load acting on a rotor of a hermetically sealed kneader according to claim 2, wherein the at least one or more displacement sensors includes a plurality of displacement sensors which are arranged at an equal distance from the axis of the rotor and circumferentially at equal intervals, and
    wherein the load calculating unit obtains a representative relative displacement by averaging measurement values measured by the plurality of the displacement sensors and calculates the thrust load acting on the rotor from the obtained representative relative displacement.

4. The device for measuring a thrust load acting on a rotor of a hermetically sealed kneader according to claim 1, wherein the at least one or more displacement sensors includes a plurality of displacement sensors which are arranged at an equal distance from the axis of the rotor and circumferentially at equal intervals, and
    wherein the load calculating unit obtains a representative relative displacement by averaging measurement values measured by the plurality of the displacement sensors and calculates the thrust load acting on the rotor from the obtained representative relative displacement.

5. The device for measuring a thrust load acting on a rotor of a hermetically sealed kneader according to claim 1, comprising a rotation sensor for detecting a rotation of the rotor,
    wherein each of the at least one or more displacement sensors measures in one rotation of the rotor, which is detected by the rotation sensor, a waveform of a relative displacement in a state where a kneading material is not inputted in the hermetically sealed kneader and a waveform of a measured relative displacement in a state where the kneading material is inputted in the hermetically sealed kneader, and
    wherein the load calculating unit calculates the thrust load acting on the rotor by using a difference waveform between the measured waveform of the relative displacement in a state where the kneading material is not inputted in the hermetically sealed kneader and the measured waveform of the relative displacement in a state where the kneading material is inputted in the hermetically sealed kneader.

* * * * *